(12) United States Patent
Bellinger (10) Patent No.: US 12,331,831 B2
(45) Date of Patent: Jun. 17, 2025

(54) DYNAMIC CONTROL OF TRANSMISSION SHIFT SCHEDULES

(71) Applicant: Cummins Inc., Columbus, IN (US)

(72) Inventor: Steven M. Bellinger, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/566,532

(22) PCT Filed: Jun. 2, 2022

(86) PCT No.: PCT/US2022/031990
§ 371 (c)(1),
(2) Date: Dec. 1, 2023

(87) PCT Pub. No.: WO2022/256548
PCT Pub. Date: Dec. 8, 2022

(65) Prior Publication Data
US 2024/0288063 A1    Aug. 29, 2024

Related U.S. Application Data

(60) Provisional application No. 63/196,342, filed on Jun. 3, 2021.

(51) Int. Cl.
*F16H 61/02* (2006.01)
*B60Q 9/00* (2006.01)
(Continued)

(52) U.S. Cl.
CPC ........... *F16H 61/0213* (2013.01); *B60Q 9/00* (2013.01); *F16H 59/18* (2013.01); *F16H 59/40* (2013.01);
(Continued)

(58) Field of Classification Search
CPC .......... F16H 59/18; F16H 59/40; F16H 59/48; F16H 59/66; F16H 59/68; F16H 59/78;
(Continued)

(56) References Cited

U.S. PATENT DOCUMENTS 4,829,434 A * 5/1989 Karmel ............... F16H 61/0213
701/55
6,840,126 B1   1/2005 Stine et al.
(Continued)

FOREIGN PATENT DOCUMENTS

EP          1 616 084        1/2006
WO    WO-2009/074860 A2    6/2009
(Continued)

OTHER PUBLICATIONS

International Search Report and Written Opinion on PCT App. PCT/US2022/31990 dated Aug. 24, 2022.

*Primary Examiner* — Edwin A Young
(74) *Attorney, Agent, or Firm* — Foley & Lardner LLP (57) ABSTRACT

Methods, apparatuses, and systems for determining a dynamic shift schedule for a system are provided. A method includes: determining, by a controller, a priority for a system based on data indicative of operation of the system; determining, by the controller, a shift point for the system based on the priority and at least one of a current gear, a current accelerator pedal position (APP), an acceleration vector, or a target gear; and taking, by the controller, an action based on the determined shift point.

20 Claims, 5 Drawing Sheets

(51) Int. Cl.
*F16H 59/18* (2006.01)
*F16H 59/40* (2006.01)
*F16H 59/48* (2006.01)
*F16H 59/66* (2006.01)
*F16H 59/68* (2006.01)
*F16H 59/78* (2006.01)

(52) U.S. Cl.
CPC ............. *F16H 59/48* (2013.01); *F16H 59/66* (2013.01); *F16H 59/68* (2013.01); *F16H 59/78* (2013.01); *F16H 2059/663* (2013.01); *F16H 2059/6815* (2013.01); *F16H 2061/022* (2013.01); *F16H 2061/0227* (2013.01)

(58) Field of Classification Search
CPC ....... F16H 2059/663; F16H 2059/6815; F16H 61/0213; F16H 2061/022; F16H 2061/0227; B60Q 9/00
See application file for complete search history.

(56) References Cited

U.S. PATENT DOCUMENTS

| | | | |
|---|---|---|---|
| 6,866,610 | B2 | 3/2005 | Ito |
| 7,628,009 | B2 | 12/2009 | Hu et al. |
| 8,577,568 | B2 | 11/2013 | Sujan et al. |
| 2009/0036267 | A1* | 2/2009 | Bellinger ............... F16H 61/143 701/55 |
| 2014/0142822 | A1 | 5/2014 | Li |
| 2014/0257654 | A1* | 9/2014 | Snarr ...................... F16H 63/42 701/58 |
| 2020/0096097 | A1 | 3/2020 | Ooshima et al. |
| 2021/0107445 | A1 | 4/2021 | Matsubara et al. |

FOREIGN PATENT DOCUMENTS

| | | |
|---|---|---|
| WO | WO-2014/204380 A1 | 12/2014 |
| WO | WO-2018/140366 A1 | 8/2018 |

\* cited by examiner

DYNAMIC CONTROL OF TRANSMISSION SHIFT SCHEDULES

CROSS-REFERENCE TO RELATED APPLICATION

This application claims the benefit of and priority to U.S. Provisional Application No. 63/196,342, filed Jun. 3, 2021, titled "DYNAMIC CONTROL OF TRANSMISSION SHIFT SCHEDULES," which is incorporated herein by reference in its entirety.

TECHNICAL FIELD

The present disclosure relates to determining transmission shift points and, particularly, transmission shift schedules. More particularly, the present disclosure relates to systems and methods for dynamically determining transmission shift schedules in order to improve aftertreatment system operation.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set emission standards to which engines must comply. Consequently, the use of exhaust aftertreatment systems on engines to reduce emissions is increasing. Exhaust aftertreatment systems are generally designed to reduce emission of particulate matter, nitrogen oxides, hydrocarbons, and other environmentally harmful pollutants.

SUMMARY

One embodiment relates to a method. The method includes determining, by a controller, a priority for a system based on data indicative of operation of the system; determining, by the controller, a shift point for the system based on the determined priority and at least one of a current gear, a current accelerator pedal position (APP), an acceleration vector, or a target gear; and taking, by the controller, an action based on the determined shift point.

Another embodiment relates to a system. The system includes a controller including a processing circuit including at least one processor coupled to at least one memory storing instructions that, when executed by the at least one processor, cause the controller to: determine a priority for a system based on data indicative of operation of the system; determine a shift point for the system based on the priority and at least one of a current gear, a current accelerator pedal position (APP), an acceleration vector, or a target gear; and take an action based on the determined shift point.

Still another embodiment relates to a non-non-transitory computer-readable medium storing instructions that, when executed by at least one processor, cause the at least one processor to perform operations including: determining a priority for a system based on data indicative of operation of the system; determining a shift point for the system based on the priority and at least one of a current gear, a current accelerator pedal position (APP), an acceleration vector, or a target gear; and taking an action based on the determined shift point.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Following below are more detailed descriptions of various concepts related to, and implementations of, methods, apparatuses, and systems for determining a dynamic shift schedule for a system based on data indicative of current system operation, and particularly, data regarding operation of an exhaust aftertreatment system of a vehicle. Before turning to the Figures, which illustrate certain exemplary embodiments in detail, it should be understood that the present disclosure is not limited to the details or methodology set forth in the description or illustrated in the Figures. It should also be understood that the terminology used herein is for the purpose of description only and should not be regarded as limiting.

In conventional powertrain systems, a transmission is coupled to an engine in order to assist in the transfer of mechanical energy from the engine to a final drive (e.g., wheels, rotor, propeller, etc.). Because the engines operate at a high rotational speed that is inappropriate for certain stages of system operation (e.g., vehicle starting/stopping), the transmission, via one or more gears or settings, reduces the rotational speed to the final drive, which in turn increases the torque. Each gear has a gear ratio indicative of an amount that the gear reduces the rotational speed when transferring the mechanical energy from the engine to the final drive. Because each gear has a different effect on system performance, knowing when and to what gear or setting to shift is important for smooth system operation.

As such, many conventional systems include electronically controlled engines and automated/automatic transmissions that are controlled in order to initiate shift events based on operation and without input from a user. If the automated system determines that a shift event is desired, the system can control the engine to reach a speed at which a shift event is optimal and then command the transmission to shift to the desired gear. These conventional systems base these shift decisions predominately on a brake thermal efficiency (BTE) of the engine. As emission regulations become stricter, conventional systems fail to account for additional operational boundaries necessary for emission compliance. By focusing on efficiency and disregarding aftertreatment system operation, these conventional systems often fail to meet emissions regulations or are forced to take more drastic measures (e.g., active heating events) in order to meet the emissions regulations.

Referring to the Figures generally, the various embodiments disclosed herein relate to systems, apparatuses, and methods for determining a dynamic shift schedule for a transmission based on data indicative of aftertreatment system operation. Technically and advantageously, the features described herein provide for improved vehicle performance by selecting gear shift schedules based on dynamically determined priorities for the vehicle, so that the gear shift events may provide a secondary benefit (e.g., thermal management of an aftertreatment system) in addition to the traditional benefits of gear shifting (e.g., reducing strain on the engine).

Figure 1:
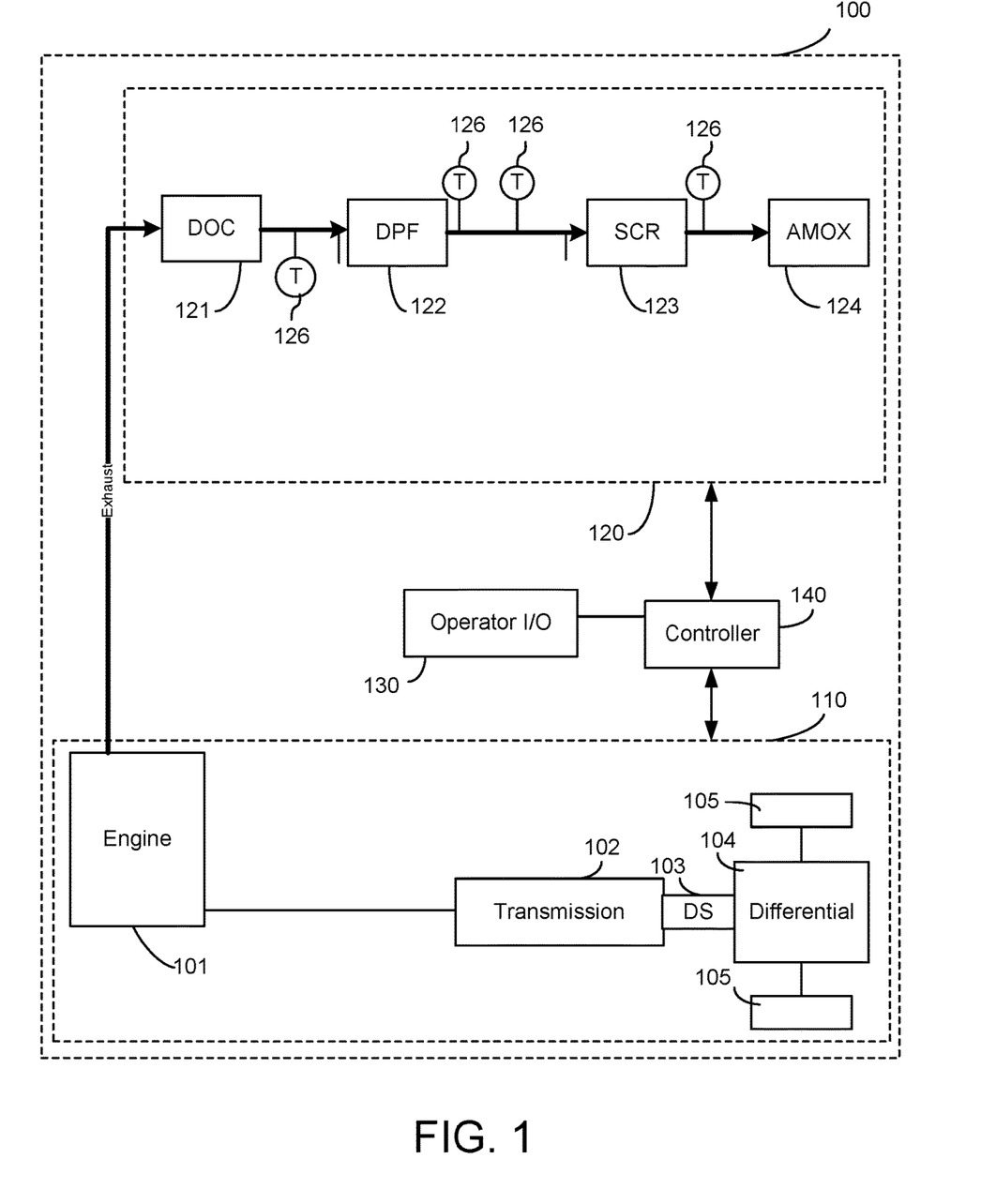
FIG. 1 is a schematic diagram of a system with a controller, according to an exemplary embodiment.

As shown in FIG. 1, a system 100 is shown to include a powertrain system 110, an aftertreatment system 120, an operator input/output (I/O) device 130, and a controller 140, where the controller 140 is communicably coupled to each of the aforementioned components. In the configuration of FIG. 1, the system 100 is included in a vehicle. The vehicle may be any type of on-road or off-road vehicle including, but not limited to, road sweeper vehicles, road sprinkler vehicles, refuse transfer vehicles, wheel-loaders, fork-lift trucks, line-haul trucks, mid-range trucks (e.g., pick-up truck, etc.), sedans, coupes, tanks, airplanes, boats, and any other type of vehicle.

As shown in FIG. 1, the powertrain system 110 includes an engine 101 and a transmission 102. The transmission 102 is operatively coupled to a drive shaft 103, which is operatively coupled to a differential 104, where the differential 104 transfers power output from the engine 101 to the final drive (shown as wheels 105) to propel the system 100.

The engine 110 may be any type of engine that generates exhaust gas, such as a gasoline, natural gas, or diesel engine, a hybrid engine system (e.g., a combination of an internal combustion engine and an electric motor), and/or any other suitable engine. In the example shown, the engine 101 is a diesel-powered compression-ignition engine. The engine 101 includes one or more cylinders and associated pistons. Air from the atmosphere is combined with fuel, and combusted, to produce power for the vehicle. Combustion of the fuel and air in the compression chambers of the engine 101 produces exhaust gas that is operatively vented to an exhaust pipe and to the exhaust aftertreatment system.

The transmission 102 receives power from the engine 110 and provides rotational power to a final drive (shown as wheels 105) of the system 100. In some embodiments, the transmission 102 is a continuously variable transmission (CVT). In other embodiments, the transmission 102 is a geared transmission comprising a plurality of gears. The transmission 102 may be an automatic, manual, automatic manual, etc. type of transmission. The transmission 102 may include one or more sensors (virtual or real) that couple to the controller 140 and provide information or data regarding operation of the transmission 102 (e.g., the current gear or operating mode, a temperature in the transmission box, etc.). The aftertreatment system 120 is in exhaust-gas receiving communication with the engine 101. The aftertreatment system includes a diesel particulate filter (DPF) 122, a diesel oxidation catalyst (DOC) 121, a selective catalytic reduction (SCR) system 123, and an ammonia oxidation catalyst (AMOX) 124. The DOC 121 is structured to receive the exhaust gas from the engine 12 and to oxidize hydrocarbons and carbon monoxide in the exhaust gas, among its other functions such as NO oxidation to NO2 to promote passive DPF regeneration and fast SCR reaction. The DPF 122 is arranged or positioned downstream of the DOC 121 and structured to remove particulates, such as soot, from exhaust gas flowing in the exhaust gas stream. The DPF 122 includes an inlet, where the exhaust gas is received, and an outlet, where the exhaust gas exits after having particulate matter substantially filtered from the exhaust gas and/or converting the particulate matter into carbon dioxide. In some implementations, the DPF 122 may be omitted.

The aftertreatment system 120 may further include a reductant delivery system which may include a decomposition chamber (e.g., decomposition reactor, reactor pipe, decomposition tube, reactor tube, etc.) to convert a reductant into ammonia. The reductant may be, for example, urea, diesel exhaust fluid (DEF), Adblue®, a urea water solution (UWS), an aqueous urea solution (e.g., AUS32, etc.), and other similar fluids. A diesel exhaust fluid (DEF) is added to the exhaust gas stream to aid in the catalytic reduction. The reductant may be injected upstream of the SCR catalyst member by a DEF doser such that the SCR catalyst member receives a mixture of the reductant and exhaust gas. The reductant droplets then undergo the processes of evaporation, thermolysis, and hydrolysis to form gaseous ammonia within the decomposition chamber, the SCR catalyst member, and/or the exhaust gas conduit system, which leaves the aftertreatment system 120. The aftertreatment system 120 may further include an oxidation catalyst (e.g. the DOC 121) fluidly coupled to the exhaust gas conduit system to oxidize hydrocarbons and carbon monoxide in the exhaust gas. In order to properly assist in this reduction, the DOC 121 may be required to be at a certain operating temperature. In some embodiments, this certain operating temperature is approximately between 200-500° C. In other embodiments, the certain operating temperature is the temperature at which the HC conversion efficiency of the DOC 121 exceeds a predefined threshold (e.g. the conversion of HC to less harmful compounds, which is known as the HC conversion efficiency).

The SCR 123 is configured to assist in the reduction of NOx emissions by accelerating a NOx reduction process between the DEF and the NOx of the exhaust gas into diatomic nitrogen, water, and/or carbon dioxide. If the SCR catalyst member is not at or above a certain temperature, the acceleration of the NOx reduction process is limited and the SCR 123 may not be operating at a necessary level of efficiency to meet regulations. In some embodiments, this certain temperature is approximately 250-300° C. The SCR catalyst member may be made from a combination of an inactive material and an active catalyst, such that the inactive material, (e.g. ceramic metal) directs the exhaust gas towards the active catalyst, which is any sort of material suitable for catalytic reduction (e.g. base metals oxides like vanadium, molybdenum, tungsten, etc. or noble metals like platinum). In some embodiments, the AMOX 124 is included and structured to address ammonia slip by removing excess ammonia from the treated exhaust gas before the treated exhaust is released into the atmosphere.

Because the aftertreatment system 120 treats the exhaust gas before the exhaust gas is released into the atmosphere, some of the particulate matter or chemicals that are treated or removed from the exhaust gas may build up in the aftertreatment system over time. For example, the soot filtered out from the exhaust gas by the DPF 122 may build up on the DPF 122 over time. Similarly, sulfur particles present in fuel may accumulate in the SCR 123 and deteriorate the effectiveness of the SCR catalyst member. Further, DEF that undergoes incomplete thermolysis upstream of the catalyst may build up and form deposits on downstream components of the aftertreatment system 120. However, these build-ups on (and subsequent deterioration of effectiveness of) these components of the aftertreatment system 120 may be reversible. In other words, the soot, sulfur, and DEF deposits may be substantially removed from the DPF 122 and the SCR 123 by increasing a temperature of the exhaust gas running through the aftertreatment system to recover performance (e.g. for the SCR, conversion efficiency of NOx to N2 and other compounds). These removal processes are referred to as regeneration events and may be performed for the DPF 122, SCR 123, or another component in the aftertreatment system 120 on which deposits develop. However, exposure to high temperatures during active regenerations degrades the DOC, DPF, and SCR catalysts. An active regeneration event is specifically commanded, such as a flow rate measurement through a DPF being below a predefined threshold indicating a partially blocked DPF which, in turn, causes the controller to command a regeneration event where exhaust gas temperatures are elevated in order to raise the temperature of the DPF and burn off the accumulated PM and other components (e.g., raise engine power output, post-injection, and other means to increase exhaust gas temperatures to cause a regeneration event). In contrast, a passive regeneration event occurs naturally during operation of the vehicle (e.g., a high load condition that may be experience while traversing a hill causes an increase in exhaust gas temperatures and regeneration event occurs naturally—not specifically commanded).

Although the aftertreatment system 120 shown includes a DOC 121, DPF 122, SCR 123, and AMOX 124 positioned in specific locations relative to each other along the exhaust flow path, in other embodiments, the exhaust aftertreatment system may include more than one of any of the various catalysts positioned in any of various positions relative to each other along the exhaust flow path as desired. Additionally, one or more components may be omitted (e.g., AMOX 124). Further, although the DOC 121 and AMOX 124 are non-selective catalysts, in some embodiments, the DOC 121 and AMOX 124 catalyst can be selective catalysts. Thus, a wide variety of architectures are possible without departing from the scope of the present disclosure.

Referring still to FIG. 1, an operator input/output (I/O) device 130 is also shown. The operator I/O device 130 may be communicably coupled to the controller 140, such that information may be exchanged between the controller 140 and the I/O device 130, wherein the information may relate to one or more components of FIG. 1 or determinations (described below) of the controller 140. The operator I/O device 130 enables an operator of the system 100 to communicate with the controller 140 and one or more components of the system 100 of FIG. 1. For example, the operator input/output device 130 may include, but is not limited to, an interactive display, a touchscreen device, one or more buttons and switches, voice command receivers, etc. In this way, the operator input/output device 130 may provide one or more indications or notifications to an operator, such as a malfunction indicator lamp (MIL), etc. Additionally, the vehicle may include a port that enables the controller 140 to connect or couple to a scan tool so that fault codes and other information regarding the vehicle may be obtained.

Figure 2:
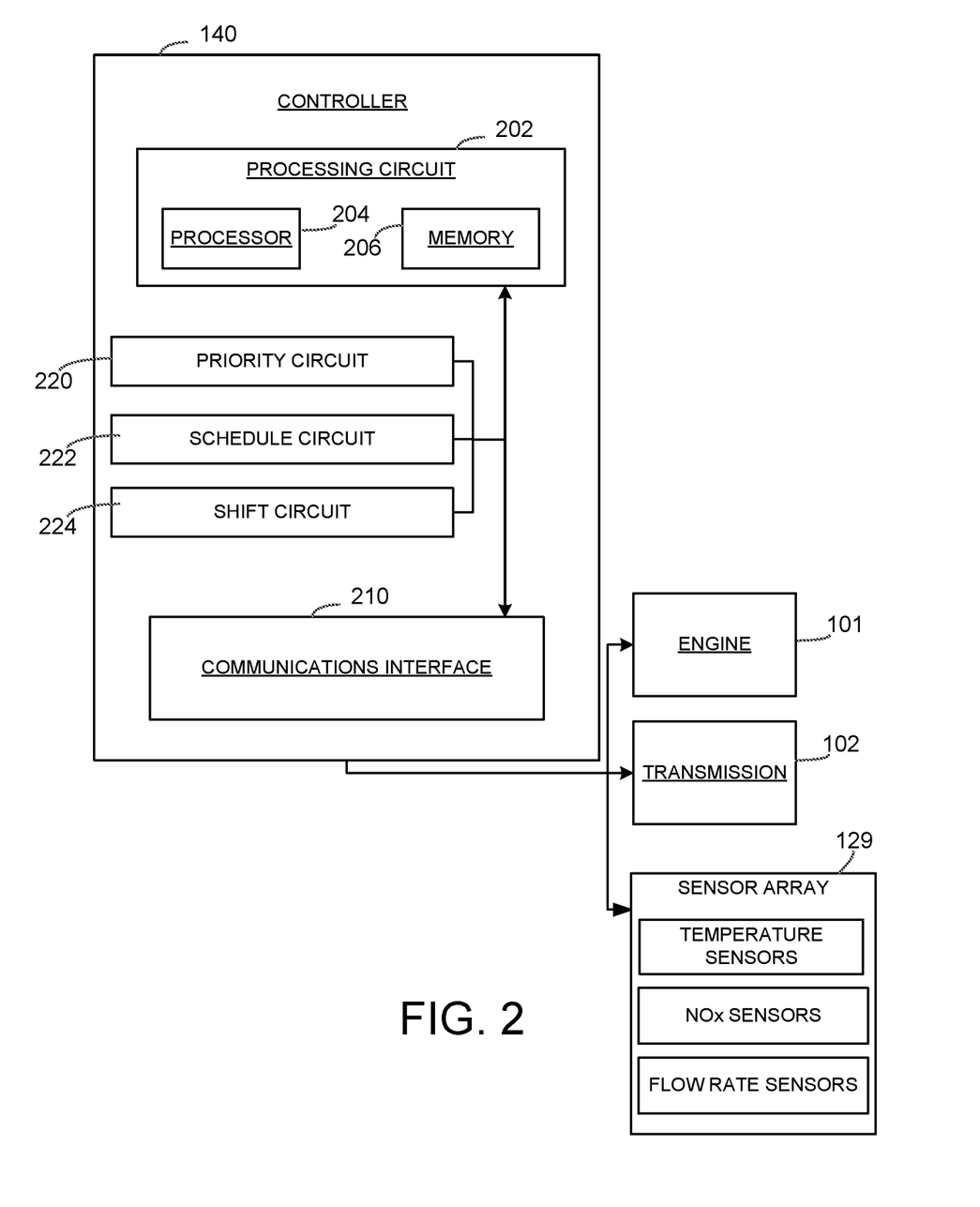
FIG. 2 is a schematic diagram of the controller of the system of FIG. 1, according to an exemplary embodiment.

Briefly referencing FIG. 2, as also shown, a sensor array 129 is included in the aftertreatment system 120. The sensors are coupled to the controller 140, such that the controller 140 can monitor and acquire data indicative of operation of the system 100. In this regard, the sensor array includes temperature sensors 126. The temperature sensors 126 acquire data indicative of or, if virtual, determine an approximate temperature of the exhaust gas at or approximately at their disposed location. The sensor array 129 may also include NOx sensors (or sensors for other emissions) that acquire data indicative of or, if virtual, determine an approximate amount of NOx (or other emissions) in the exhaust gas stream at or approximately at their disposed locations (e.g., immediately downstream of the engine 101, immediately downstream of the aftertreatment system 120, etc.). Furthermore, the sensor array 129 may include an accelerator pedal position (APP) sensor that is structured to acquire data or information indicative of an accelerator pedal position of the vehicle 100. The APP sensor may be coupled to an accelerator pedal of the vehicle 100 but in other embodiments, the APP sensor may be positioned elsewhere (e.g., coupled to the cab and monitoring the accelerator pedal position such that the sensor may be a hall effect sensor, etc.) or structured differently. In operation, the APP sensor 114 acquires information indicative of a depression amount of the accelerator pedal (from zero percent, not depressed at all, to one hundred percent, which is completely depressed). It should be understood that the depicted locations, numbers, and type of sensors is illustrative only. In other embodiments, the sensors may be positioned in other locations, there may be more or less sensors than shown, and/or different/additional sensors may also be included with the system 100 (e.g., a flow rate sensor, a pressure sensor, etc.). Those of ordinary skill in the art will appreciate and recognize the high configurability of the sensors in the system 100.

The controller 140 is structured to control, at least partly, the operation of the system 100 and associated sub-systems, such as the engine 101, the transmission 102, and the operator input/output (I/O) device 130. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 140 is communicably coupled to the systems and components of FIG. 1, the controller 140 is structured to receive data from one or more of the components shown in FIG. 1.

As the components of FIG. 1 are shown to be embodied in the system 100, the controller 140 may be structured as one or more electronic control units (ECU), such as a microcontroller. The structure and function of the controller 140 is further described in regard to FIG. 2. The controller 140 may be separate from or included with at least one of a transmission control unit, an exhaust aftertreatment control unit, a powertrain control module, an engine control module, etc. In one embodiment, the components of the controller 140 are combined into a single unit. In another embodiment, one or more of the components may be geographically dispersed throughout the system or vehicle. All such variations are intended to fall within the scope of the disclosure.

Referring now to FIG. 2, a schematic diagram of the controller 140 of the system 100 of FIG. 1 is shown according to an example embodiment. As shown in FIG. 2, the controller 140 includes a processing circuit 202 having a processor 204 and a memory 206, a priority circuit 220, a schedule circuit 222, a shift circuit 224, and a communications interface 210. The controller 140 is structured or configured to determine a priority for the system 100 based on data indicative of system 100 performance and to determine a dynamic shift schedule based on the determined priority. From there, the controller 140 determines a shift point based on the dynamic shift schedule and either notifies a user or commands a shift event. In an example embodiment for operation, the controller 140 determines a priority for the system 100, and then determines an appropriate shift point based on the determined priority. The appropriate shift point is determined either from a plurality of table-based schedules stored in a memory of the controller 140 (e.g., the memory 206), or via a physics-based approach in which the controller 140 dynamically determines the appropriate shift point based on one or more operating parameters (e.g., APP, engine 101 load, acceleration vector, system 100 mass, road slope, acceleration rate, etc.). The controller 140 determines appropriate shift point is light of the determined priority, which prioritizes one or more of engine 101 peak efficiency (e.g., fuel efficiency) and exhaust gas temperature (i.e., to induce heat flux).

In one configuration, the priority circuit 220, the schedule circuit 222, and the shift circuit 224 are embodied as machine or computer-readable media storing instructions that are executable by a processor, such as processor 204. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media instructions may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the priority circuit 220, the schedule circuit 222, and the shift circuit 224 are embodied as hardware units, such as electronic control units. As such, the priority circuit 220, the schedule circuit 222, and the shift circuit 224 may be embodied as one or more circuitry components including, but not limited to, processing circuitry, network interfaces, peripheral devices, input devices, output devices, sensors, etc. In some embodiments, the priority circuit 220, the schedule circuit 222, and the shift circuit 224 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the priority circuit 220, the schedule circuit 222, and the shift circuit 224 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The priority circuit 220, the schedule circuit 222, and the shift circuit 224 may also include programmable hardware devices such as field programmable gate arrays, programmable array logic, programmable logic devices or the like. The priority circuit 220, the schedule circuit 222, and the shift circuit 224 may include one or more memory devices for storing instructions that are executable by the processor(s) of the priority circuit 220, the schedule circuit 222, and the shift circuit 224. The one or more memory devices and processor(s) may have the same definition as provided below with respect to the memory 202 and processor 204. In some hardware unit configurations, the priority circuit 220, the schedule circuit 222, and the shift circuit 224 may be geographically dispersed throughout separate locations in the vehicle. Alternatively and as shown, the priority circuit 220, the schedule circuit 222, and the shift circuit 224 may be embodied in or within a single unit/housing, which is shown as the controller 140.

In the example shown, the controller 140 includes the processing circuit 202 having the processor 204 and the memory 206. The processing circuit 202 may be structured or configured to execute or implement the instructions, commands, and/or control processes described herein with respect to the priority circuit 220, the schedule circuit 222, and the shift circuit 224. The depicted configuration represents the priority circuit 220, the schedule circuit 222, and the shift circuit 224 as machine or computer-readable media storing instructions. However, as mentioned above, this illustration is not meant to be limiting as the present disclosure contemplates other embodiments where the priority circuit 220, the schedule circuit 222, and the shift circuit 224, or at least one circuit of the priority circuit 220, the schedule circuit 222, and the shift circuit 224, is configured as a hardware unit. All such combinations and variations are intended to fall within the scope of the present disclosure.

The processor 204 may be implemented as a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor may be a microprocessor. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the priority circuit 220, the schedule circuit 222, and the shift circuit 224) may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory 206 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory 206 may be communicably connected to the processor 204 to provide computer code or instructions to the processor 204 for executing at least some of the processes described herein. Moreover, the memory 206 may be or include tangible, non-transient volatile memory or non-volatile memory. Accordingly, the memory 206 may include database components, object code components, script components, or any other type of information structure for supporting the various activities and information structures described herein.

The communications interface 210 may include any combination of wired and/or wireless interfaces (e.g., jacks, antennas, transmitters, receivers, transceivers, wire terminals) for conducting data communications with various systems, devices, or networks structured to enable in-vehicle communications (e.g., between and among the components of the vehicle) and out-of-vehicle communications (e.g., with a remote server). For example and regarding out-of-vehicle/system communications, the communications interface 210 may include an Ethernet card and port for sending and receiving data via an Ethernet-based communications network and/or a Wi-Fi transceiver for communicating via a wireless communications network. The communications interface 210 may be structured to communicate via local area networks or wide area networks (e.g., the Internet) and may use a variety of communications protocols (e.g., IP, LON, Bluetooth, ZigBee, radio, cellular, near field communication).

The priority circuit 220 is structured or configured to receive data indicative of system 100 operation and to determine a priority for the system 100 based on the data. As used herein, the term "priority" as used with "priority for the system" refers to a prioritization focus for the system 100. For example, a prioritization focus for the system may be fuel economy. In which case, the priority circuit 220 and controller, in general, may implement various actions to conserve fuel over a mission. As another example, a prioritization focus for the system may be an emissions characteristic (e.g., reducing NOx below a predefined threshold value or rate). Accordingly, the controller may take various actions (e.g., activate an electronic heater, increase load where appropriate) that improve operation of the aftertreatment system of the system to work to achieve the desired emissions characteristic (e.g., reduce NOx emissions). As yet another example, a prioritization focus may be on performance of the vehicle, such that the controller may enable increased power output from the vehicle even though fuel economy may be sacrificed. As still yet another example, a prioritization focus may be on reducing the number of shift events. In which case, the controller may actively skip otherwise-planned transmission shift events and/or otherwise function to reduce the number of shift events that otherwise would be experienced. It should be understood that the list of aforementioned prioritization focuses is not meant to be limiting, such that additional and/or different prioritization focuses are contemplated as falling within the present disclosure. Moreover, two or more prioritization focuses may be used together in certain embodiments.

The data indicative of system 100 operation includes at least one of an engine 101 operation data, such as an operation mode, a temperature of one or more components in the aftertreatment system 120, and/or other data regarding operation of the system 100. Accordingly, the data indicative of system 100 operation may include engine 101 charge/intake manifold temperature, charge flow rate, exhaust flow rate, brake-specific NOx (BSNOx), road load/reserve power in current and target gears, road topography (i.e., look-ahead road grade data), engine speed, engine torque, emissions characteristic (e.g., exhaust gas NOx values at various locations, temperature characteristics, reductant dosing rates and quantities), fueling information (e.g., quantity and rate), and so on. As used herein, the phrase "engine 101 operation mode" or "engine operation mode" refers to whether the engine 101 is operating "lean" (i.e., an air to fuel ratio above stoichiometric conditions), which may result in increases in efficiency and higher exhaust gas temperatures, "rich" (i.e., an air to fuel ratio lower than stoichiometric), which may produce more power yet cooler exhaust gas temperatures, or other operating modes of the engine. For example, the "engine operation mode" can also refer to whether the engine 101 is operating in a cylinder deactivation (CDA) mode in which the controller 140 selectively activates and deactivates (i.e. combustion does not occur) one or more of cylinders of the engine 101 during operation of the engine 101. Operating an engine in CDA mode can increase the temperature of the exhaust gas by reducing the overall flow of exhaust gas and/or requiring the active cylinders to produce the same amount of total work. The determination of engine 101 operation mode, in some embodiments, is selected based on various operating parameters, such as data/information regarding operation of the aftertreatment system 120 (e.g., if a temperature of the SCR 123 is below a threshold, the engine 101 operation mode is hot).

The temperature of one or more components in the aftertreatment system 120 refers to a temperature of at least one of the DOC 121, DPF, SCR 123, or AMOX 124. The temperature of each component of the aftertreatment system 120 may be determined by a temperature sensor (i.e., of the sensor array 129) either embedded in the component or in the exhaust gas stream upstream and/or downstream of the component (i.e., proximate to the component). By determining a temperature of the exhaust gas passing through the component, the temperature of the component itself can be determined. Alternatively, the temperature of each component may be determined by one or more virtual sensors that estimate the aftertreatment system 120 component temperature based on one or more operating parameters (e.g., exhaust flow rate, EGR, DEF dosing rate, etc.).

Based on at least one of the engine 101 operation mode and the temperature of one or more aftertreatment system 120 components, the priority circuit 220 determines a priority for the system 100. The priority (also referred to as a prioritization focus as mentioned above) may be one of two priorities. In a first priority ("Priority 1"), the system 100, via the controller 140 (and, particularly, the priority circuit 220) prioritizes fuel economy of the vehicle (i.e., lower fuel consumption per distance traveled). In one embodiment, tracking performance under a may be done by the circuit 220 monitoring fuel consumption or fuel economy of the vehicle (is the amount of fuel used per unit distance). In another embodiment, the priority circuit 220 may track performance under Priority 1 via another indicator. For example, the priority circuit 220 may track brake specific fuel consumption (BSFC) which at a high level refers to the rate of fuel consumption relative to the power output produced by the engine. In yet another embodiment, a different indicator of fuel consumption and/or fuel efficiency (e.g., how well the vehicle or system uses the inputted fuel) may be used, such as brake thermal efficiency (BTE). Although BTE does not directly indicate fuel consumption, by providing a ratio of an amount of actual power applied to the final drive to an amount of total amount of energy generated by burned fuel, the BTE provides a picture of how well (or poorly) the engine 101 is utilizing the energy from the fuel. Relatively poor utilization of the fuel energy leads to poor fuel efficiency because the engine 101 is burning more fuel in order to generate the actual power for the final drive, while relatively good utilization of the fuel energy leads to good fuel efficiency.

The priority circuit 220 determines the first priority if the engine 101 operation mode is lean and/or if the temperature of one or more aftertreatment system components is above a predefined desired operating threshold value. In one embodiment, the operating threshold value is as a desired operating temperature threshold value, which is a temperature or range of temperatures at which the aftertreatment system 120 component is operating as intended. For example, if the component of the aftertreatment system 120 is the SCR 123, the predefined operating threshold value is a value (e.g., 250° C.) at which the SCR 123 is reducing an amount of NOx in the exhaust gas at a desired conversion efficiency (e.g., a rate at which NOx is converted to less harmful compounds). In some embodiments, the priority circuit 220 determines the first priority if at least one aftertreatment system 120 component has a temperature above its respective threshold temperature value, while in other embodiments, the priority circuit 220 determines the first priority if more than one aftertreatment system 120 component has a temperature above its respective temperature threshold value for the respective component. In other embodiments, the priority circuit 220 determines the first priority if the look-ahead road grade data indicates an uphill portion of road is upcoming because, during an uphill portion, the engine 101 operates or is likely to operate at a relatively higher load than during relative flat grade operations. The increase in load is likely to result in an increase exhaust gas temperatures. Accordingly, the priority circuit 220 identifies situations or periods associated with relatively higher exhaust gas temperatures and, in turn, determines that additional operations may be skipped, avoided, or otherwise eliminated because there is not or less of a need to prioritize aftertreatment system 120 given the relatively higher aftertreatment system 120 temperatures that will occur through operation of the vehicle.

In a second priority ("Priority 2"), the priority circuit 220 prioritizes aftertreatment system 120 performance by focusing on higher exhaust gas temperatures at the expense of fuel economy and/or system performance. Exhaust gas temperature may be estimated or indicated by a sensed temperature of the exhaust gas at any point in the exhaust gas stream. One such point may be at an outlet of the engine 101. Another point may be an outlet of a turbine of the engine 101, for those embodiments in which the engine 101 is coupled to a turbocharger that includes a turbine. Measuring the exhaust gas temperature at this point provides a value for turbine-out temperature (TOT), which can be an effective substitute or estimate for exhaust gas temperature, as it provides a temperature of the exhaust gas leaving the engine 101 but before the exhaust gas enters the aftertreatment system. Furthermore, because Priority 2 focuses is on increasing the exhaust gas temperature by affecting engine 101 operation (via gear shifting), estimating exhaust gas temperature at the point at which the exhaust gas is leaving the engine 101 provides a more informative exhaust gas temperature value than if the exhaust gas temperature were measured at other points in the system 100.

By focusing on higher TOT, the system 100 is actively warming aftertreatment system 120 components by increasing the temperature of the exhaust gas that flows through the components. Because the temperature of the exhaust gas is higher than the temperature of the aftertreatment system 120 components, the hotter exhaust gas induces heat flux, which refers to the transfer of heat energy from a relatively hotter object (e.g., exhaust gas) to a relatively cooler object (e.g., aftertreatment system 120 components). Because the performance of many aftertreatment system 120 components is related to component temperature (e.g., SCR 123, AMOX 124), by increasing a temperature of the components, the performance of those same components may be improved. The priority circuit 220 determines the second priority if the temperature of one or more aftertreatment system 120 components is below an operating threshold value, which may be a temperature at which the aftertreatment system 120 component is operating as intended. In some embodiments, the temperature of one or more aftertreatment system 120 components is a temperature of the component itself (e.g., via an embedded sensors), while in other embodiments, the temperature of one or more aftertreatment system 120 components is a temperature of exhaust gas passing through the aftertreatment system 120 components (e.g., via sensors upstream and/or downstream of the component). For example, if the component of the aftertreatment system 120 is the SCR 123, the operating threshold value is a value at which the SCR 123 is efficiently reducing an amount of NOx in the exhaust (e.g., 250° C.). In some embodiments, the priority circuit 220 determines the second priority if at least one aftertreatment system 120 component has a temperature below the respective threshold value, while in other embodiments, the priority circuit 220 determines the first priority if more than one aftertreatment system 120 component has a temperature below the respective threshold value.

In those situations in which one or more components have a temperature below the respective threshold value but one or more other components simultaneously have a temperature at or above their respective threshold values, in some embodiments, the priority circuit 220 may make the priority determination based on a single component (i.e., a "controlling" component). For example, if the DPF 122 and DOC 121 temperatures are below their respective threshold values but the SCR 123, which in this example is the controlling component, temperature is at or above its respective threshold value, the priority circuit 220 does not determine the second priority because the temperature of the single controlling component (the SCR 123) is at or above the threshold value. The priority circuit 220 may utilize look-ahead road grade data or other future-looking data to inform the priority determination. For example, if the DPF 122 and DOC 121 temperatures are at or above their respective threshold values but the SCR 123, which is the controlling component, temperature is below the respective threshold value, the priority circuit 220 may analyze the road grade data to determine whether the second priority is desired to raise the SCR 123 temperature. In some embodiments, if the road grade data indicates a period of uphill slope within a pre-defined range (e.g., 2 miles) and for a pre-defined distance (e.g., 0.5 miles), the priority circuit 220 does not determine the second priority because the upcoming period of uphill slope causes the engine 101 to work harder and generate hotter exhaust gas. Alternatively, if the road grade data indicates a period of flat or downhill slope within a pre-defined range (e.g., 2 miles) and for a pre-defined distance (e.g., 1.5 miles), the priority circuit 220 determines the second priority because the engine 101 is unlikely to generate hot enough exhaust gas due to the lack of uphill slope. In other embodiments, the controller 140 estimates a TOT value based on the upcoming road grade rather than comparing the road grade data to one or more thresholds. This estimation may be based on data indicative of system 100 operation, which may include engine 101 charge/intake manifold temperature, charge flow rate, exhaust flow rate, brake-specific NOx (BSNOX), road load/reserve power in current and target gears, engine speed, engine torque, emissions characteristic (e.g., exhaust gas NOx values at various locations, temperature characteristics, reductant dosing rates and quantities), and fueling information (e.g., quantity and rate), which is analyzed in light of the upcoming road grade data (e.g., a look-up table may correlate TOT temperature or other temperature to specific vehicle speeds and road grades (and potentially other parameters non-exhaustively listed above). From there, the priority circuit 220 uses the estimated TOT value to inform its priority determination. In some embodiments, the priority includes a third priority ("Priority 3") in which the controller 140 balances efficiency and aftertreatment system 120 performance. As used here, "balance" refers to balancing fuel-efficiency concerns and aftertreatment system 120 performance concerns with substantially equal importance, such that BTE and TOT are both considered. Relative to Priority 1 and Priority 2, Priority 3 may be considered a transition priority, such that the priority circuit 220 determines the third priority when passing from the first priority to the second priority or from the second priority to the first priority. In this way, the criteria for a third priority determination may overlap with criteria for the first and/or second priority determination. For example, the priority circuit 220 determines the third priority if the system 100 is currently in second priority (i.e., aftertreatment system 120 performance) but only one aftertreatment system 120 component is remaining below the respective threshold value. In this example (which is similar to the above discussed embodiment for the second priority), the priority circuit 220 may determine the third priority if the aftertreatment system 120 component whose temperature remains below the respective threshold value is the controlling component (e.g., the SCR 123) because the third priority still puts some emphasis on hotter TOT to warm the controlling component but does so in a more fuel-efficient manner.

The schedule circuit 222 is configured or structured to receive the determined priority from the priority circuit 220 and to determine a shift schedule based on the determined priority. In a first embodiment, the schedule circuit 222 may determine the shift schedule using a table-based approach whereby a series or plurality of transmission shift schedules are stored in the circuit 222 for retrieval (or, in another embodiment, by the memory 206), or may be received via the telematics unit from a third-party computer. In this table-based embodiment, each shift schedule of the plurality of shift schedules may be configured as a table (e.g. a look-up table, etc.) that, for all or substantially possible shift scenarios (e.g., gear x to gear x+1, gear x+1 to gear x+2, . . . gear x+1 to gear x), maps an accelerator pedal position (APP) with a transmission 102 output shaft speed for the shift event. For example and using the table-based approach, at fifty-percent APP (i.e., the accelerator pedal is halfway depressed), a shift event from second gear to third gear would occur at 500 RPM transmission output shaft speed. As such, based on an APP, a controller (e.g., controller 140) determines at what transmission output shaft speed to suggest (for a manual transmission) or command (for an automatic transmission) a desired gear shift (e.g., one up or one down relative to the instant gear).

In operation, the schedule circuit 222 may receive one or more pre-determined shift schedules (e.g., from a third party), and associate each of the one or more pre-determined shift schedules with a priority from the priority circuit 220. For example, the schedule circuit 222 may associate a first shift schedule that has shift points that improve fuel-efficiency and drivability with the first priority, and may associate a second shift schedule that has shift points that improve exhaust gas temperature with the second priority. The schedule circuit 222 may then associate a third shift schedule with the third priority, or may define a third shift schedule by interpolating shift point values from the first and second shift schedules. Put differently, if the third priority is determined to be an even or substantially even split between prioritizing fuel-efficiency concerns and aftertreatment system 120 performance concerns, the schedule circuit 222 defines shift points in the third shift schedule as a halfway point between corresponding values in the first shift schedule (corresponding to efficiency concerns) and in the second shift schedule (corresponding to aftertreatment system 120 concerns). In other examples, if a single aftertreatment system 120 component remains below the respective threshold and the priority circuit 220 subsequently determines the third priority, the schedule circuit 222 may define shift points as 25% of the second priority shift schedule and 75% of the first priority shift schedule to reflect an interpolation that favors the first priority (due to only a single aftertreatment system 120 component temperature remaining below the respective threshold). By defining the shift points for the third priority via interpolation (rather than pre-defined and storing), the schedule circuit 222 provides a technical solution by reducing the amount of storage occupied by shift schedules. Furthermore, because the schedule circuit 222 is not reliant on pre-defined tables, the schedule circuit 222 is more adaptive and can respond more dynamically to changing conditions.

Figure 3:
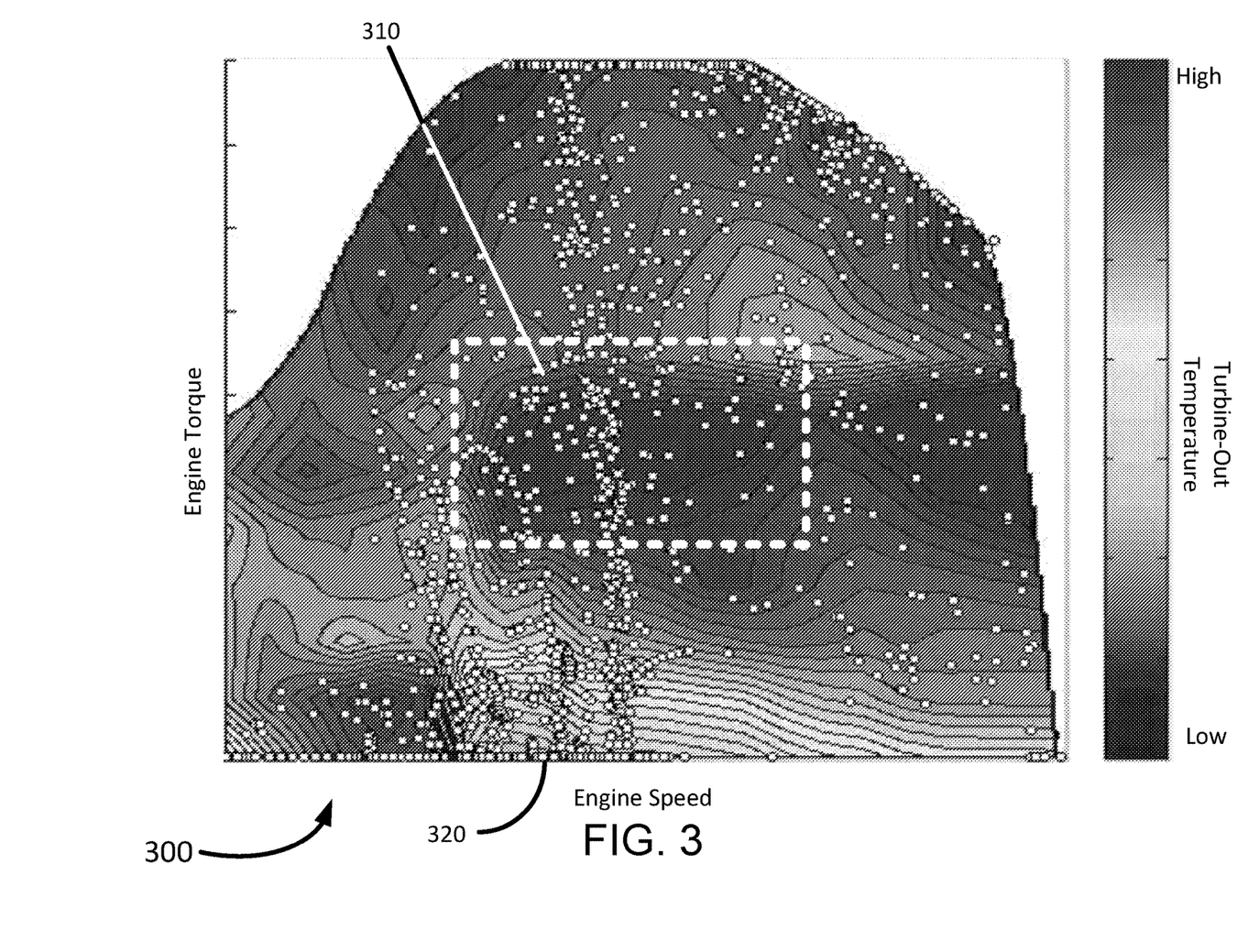
FIG. 3 is a plot of turbine-out temperature as a function of engine speed and engine torque, according to an exemplary embodiment.
Figure 4:
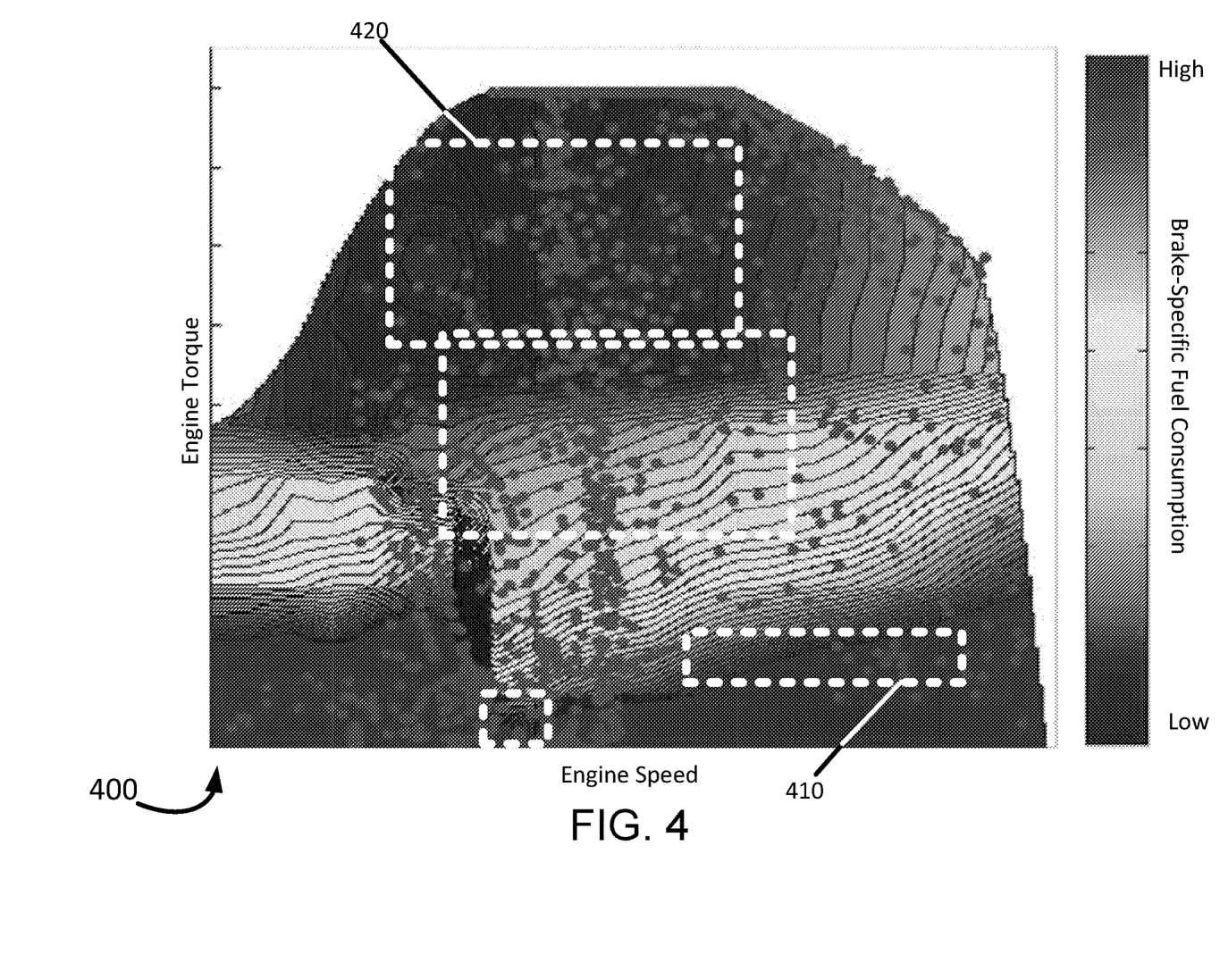
FIG. 4 is a plot of brake-specific fuel consumption as a function of engine speed and engine torque, according to an exemplary embodiment.

In a second embodiment, the schedule circuit 222 may determine the shift schedule using a physics-based approach. In which case, the schedule circuit 222 dynamically determines a transmission output shaft speed for a shift-event based on real-time operating parameters (e.g., current engine 101 load, TOT, BTE, etc.). In some embodiments, in order to determine transmission 102 output shaft speeds based on the determined priority (i.e., translate or transform the data indicative of system 100 operation to a target transmission 102 output shaft speed), the schedule circuit 222 utilizes one or more maps that plot various parameters as a function of engine 101 speed and engine 101 torque. These various parameters may include at least a TOT or BTE, which correspond to the parameters associated with the first, second, and third priorities. In some embodiments, Brake Specific Fuel Consumption (BSFC) is utilized in parallel with or instead of BTE to estimate or indicate fuel-efficiency. While BTE and BSFC are calculated differently and represent different measurements, both may be used as indicators of fuel-efficiency. FIG. 3 is a plot 300 of TOT as a function of engine speed and engine torque, according to an exemplary embodiment. The x-axis of the plot 300 is a speed of the engine 101, the y-axis of the plot 300 is a torque of the engine 101, and a color on the plot 300 is a TOT at values for engine 101 speed and torque. As shown in FIG. 3, area 310 corresponds to a range of high TOT values and is bound by values for engine 101 speed and engine 101 torque. In contrast, area 320 corresponds to a range of low TOT values and is bound by values for engine 101 speed and engine 101 torque. FIG. 4 is a plot 400 of BSFC as a function of engine speed and engine torque, according to an exemplary embodiment. An x-axis of the plot 400 is a speed of the engine 101, a y-axis of the plot 400 is a torque of the engine 101, and a color on the plot 400 is a BSFC at values for engine 101 speed and torque. As shown in FIG. 4, area 410 corresponds to a range of high BSFC values and is bound by values for engine 101 speed and engine 101 torque. In contrast, area 420 corresponds to a range of low BSFC values and is bound by values for engine 101 speed and engine 101 torque.

Based on the determined priority, the schedule circuit 222 applies a weight on values from the one or more maps in order to determine transmission 102 output shaft speeds for a dynamic shift schedule. For example, when the determined priority is the first priority (i.e., emphasis on fuel-efficiency), the schedule circuit 222 puts more weight on values for engine 101 speed and torque that result in a lower BTE (or BSFC) than on values for engine 101 speed and torque that result in higher TOT. As such, referring to FIG. 4, the schedule circuit 222 utilizes values for engine 101 speed and torque that result in a lower BSFC (e.g., area 420). In some embodiments, the schedule circuit 222 puts more weight on lower BTE values by determining the dynamic shift schedule using only lower BTE values, while in other embodiments, the schedule circuit 222 considers lower BTE values and higher TOT values for determining the dynamic shift schedule, but applies a higher weighting factor (e.g., >0.5) to lower BTE values. For example, when determining a "combined" value in the dynamic shift schedule for engine 101 torque (i.e., a value for engine 101 torque that is based on values for lower BTE and higher TOT), the combined value is based on a weighted sum of a value for engine 101 torque that results in a lower BTE and a value of engine 101 torque that results in a higher TOT. When the determined priority is the first priority, the weight applied to the lower BTE engine 101 torque value is greater (e.g., 0.75) than the weight applied to the higher TOT engine 101 torque value (e.g., 0.25), such that the "combined" value here is 0.75 times the engine 101 torque value associated with lower BTE and 0.25 times the engine 101 torque value associated with higher TOT.

Alternatively, when the determined priority is the second priority (i.e., emphasis on aftertreatment system 120 temperature), the schedule circuit 222 puts applies a weight on values for engine 101 speed and torque that result in a higher TOT than on values for engine 101 speed and torque that result in lower BTE (or BSFC). As such, referring to FIG. 3, the schedule circuit 222 utilizes values for engine 101 speed and torque that result in a higher TOT (e.g., area 310). In some embodiments, the schedule circuit 222 puts more weight on higher TOT values by determining the dynamic shift schedule using only higher TOT values, while in other embodiments, the schedule circuit 222 considers lower BTE values and higher TOT values for determining the dynamic shift schedule, but applies a higher weighting factor (e.g., >0.5) to higher TOT values.

Finally, when the determined priority is the third priority (i.e., balancing efficiency and aftertreatment system 120 temperature), the schedule circuit 222 puts substantially equal weight on values for engine 101 speed and torque that result in a higher TOT and on values for engine 101 speed and torque that result in lower BTE (or BSFC). In some embodiments, the schedule circuit 222 applies a substantially equal weighting factor (e.g., 0.5) to lower BTE values and higher TOT values, while in other embodiments, the schedule circuit 222 utilizes values for engine 101 speed and torque that result in both lower BTE and higher TOT.

The shift circuit 224 is structured or configured to determine a shift point for the system 100 based on the shift schedule from the schedule circuit 222. For table-based embodiments, the shift circuit determines an APP (or engine 101 load) and a current gear. The shift circuit 224 then determines a target gear. In some embodiments, the target gear is based on the APP and current gear, while in other embodiments, the target gear is received from the user (e.g., via the I/O device 130). Once the target gear has been determined, the shift circuit 224 determines a shift point (i.e., the transmission 102 output shaft speed) using the pre-defined shift points of the shift schedule. In some embodiments, the shift circuit 224 notifies a user (e.g., a driver) of the shift point (e.g., via the I/O device 130), or notifies the user when a current transmission 102 output shaft speed matches the shift point. In other embodiments, the shift circuit 224 affirmatively commands the shift event when the current transmission 102 output shaft speed matches the shift point, such that the controller 140 sends a command to the transmission 120 to shift from the current gear to the target gear.

For physics-based embodiments, the shift circuit 224 similarly determines an APP and current gear but further determines an acceleration vector, which is a combination of acceleration amount and direction (e.g., 10 mph increase where "increase" is the "direction"). This acceleration vector determination, in some embodiments, is based in part on look-ahead road grade data (e.g., via a telematics device) that the shift circuit 224 uses to predict an acceleration vector. For example, if the look-ahead road grade data indicates that a portion of downhill slope is upcoming, the shift circuit 224 predicts that the acceleration vector is a positive direction because the system 100 is likely to accelerate going down the downhill slope. Alternatively, in other embodiments, the determination of the acceleration vector is based on a trend of the APP (or engine 101 load), such that the shift circuit 224 predicts an acceleration vector based on a previous pattern of user-initiated acceleration.

From there, the shift circuit 224 determines a target gear. In some embodiments, the target gear is based on the APP, current gear, and acceleration vector, while in other embodiments, the target gear is received from the user (e.g., via the I/O device 130). Once the target gear has been determined, the shift circuit 224 determines a shift point based on the dynamic shift schedule determined by the schedule circuit 222 based on the priority from the priority circuit 220.

Figure 5:
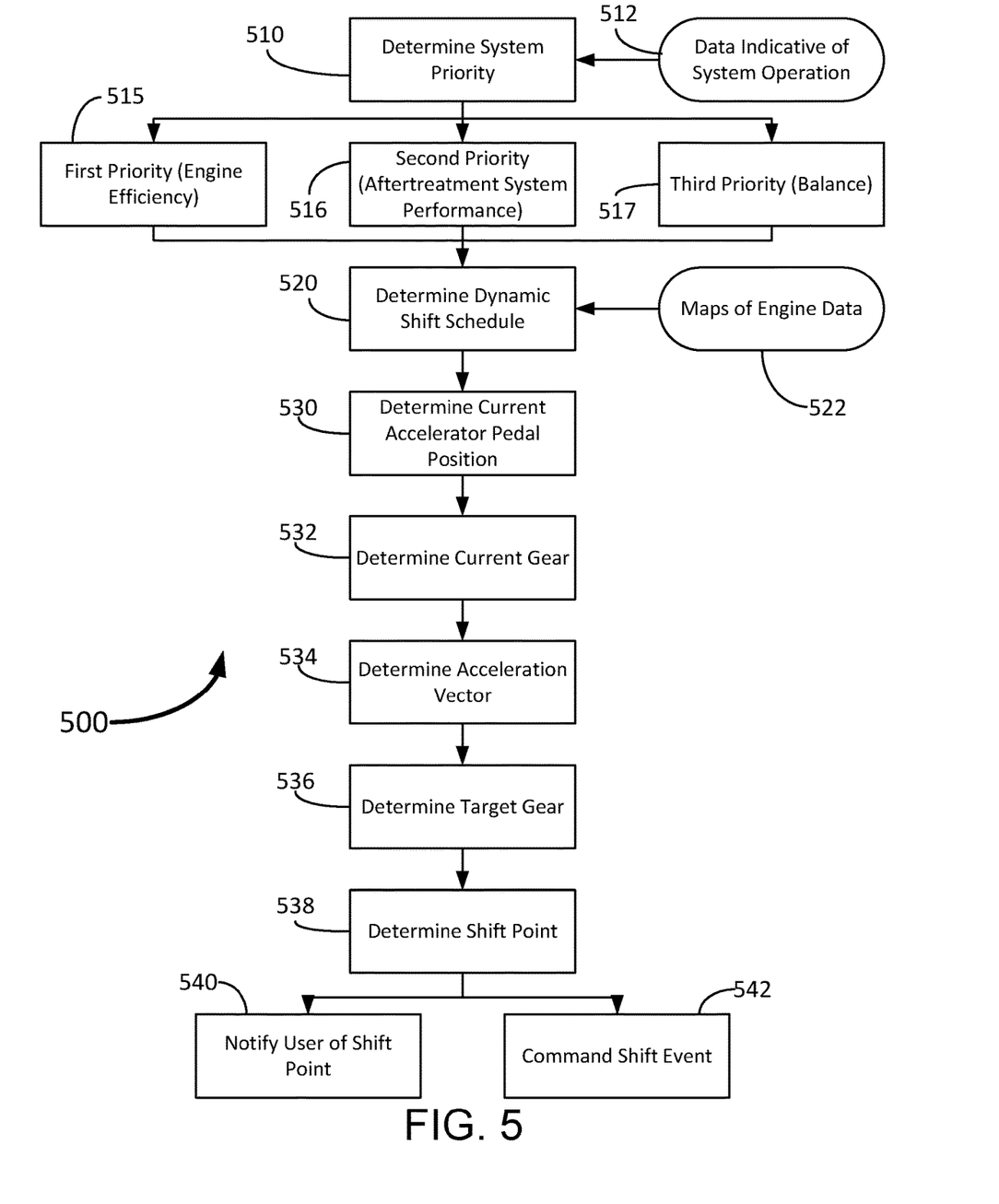
FIG. 5 is a flow chart of a method utilized by the controller of FIGS. 1-2 to dynamically determine shift schedules that include shift points for a transmission of the system of FIG. 1 based on data indicative of system operation, according to an exemplary embodiment.

FIG. 5 is a flow chart of a method 500 utilized by the controller 140 to dynamically select a shift point from a shift schedule for the transmission 102 based on data indicative of system 100 operation. In this situation, the controller 140 is applying a physics-based approach, like described above, to determine shift points for the transmission. As shown in FIG. 5, the method 500 begins at process 510, where the controller determines a system 100 priority, based on data received at 512 indicative of system 100 operation, which includes at least one of an engine 101 operation mode, a temperature of one or more aftertreatment system 120 components, engine 101 charge/intake manifold temperature, charge flow rate, exhaust flow rate, brake-specific NOx (BSNOx), road load/reserve power in current and target gears, and/or upcoming road topography (i.e., look-ahead road grade data). From there, the priority is determined to be a first priority at 515, a second priority at 516, or a third priority at 517. As discussed herein with regard to the priority circuit 220, the determination of the first priority at 515, the second priority at 516, or the third priority at 517 is based on at least one of the engine 101 operation mode or a temperature of one or more aftertreatment system 120 components. From there, the method 500 proceeds to process 520 where the controller 140 determines a dynamic shift schedule based on the determined priority (i.e., from 515, 516, or 517). The controller 140 determines the dynamic shift schedule using one or more maps received from process 522. As discussed herein with regard to the schedule circuit 222, the one or more maps at 522 include data indicative of at least one of BTE or TOT as a function of engine 101 performance.

Once the controller 140 has determined the dynamic shift schedule, the method 500 proceeds to process 530, where the controller 140 determines a current APP or engine 101 load percentage, and to process 532 where the controller 140 determines a current gear of the transmission 102. The controller 140 then determines an acceleration vector for the system 100 at 534, which, as described herein with regard to the shift circuit 224, may be determined based on at least one of look-ahead grade data or previous APP. The target gear is determined at 536, which may be based on the acceleration vector and the current gear, or may be received from a user. Once the target gear has been determined at 538, the controller 140 determines a shift point using the dynamic shift schedule, the current gear, the target gear, and the APP. From there, the controller 140 proceeds to either process 540 or 542. At 540, the controller 140 notifies the user of the shift point via the I/O device 130, while at 542, the controller 140 initiates a shift event when the transmission 102 output shaft speed matches the shift point.

In some embodiments, each of the steps of method 500 are performed by a single centralized controller (i.e., controller 140). In other embodiments for operation, steps of method 500 are performed by multiple controllers (e.g., an engine 101 controller, a transmission 102 controller, etc.). For example, an engine 101 controller may perform the steps related to determining the priority (i.e., 510, 512, and 515-517) and to determining appropriate shift points (i.e., 520 and 522). From there, the engine 101 controller communicates with and transmits to a transmission 102 controller, which performs the steps related to determining and applying an optimal shift point for the given priority (i.e., 530, 532, 538, 540, and 542).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 2, it should be understood that the controller 140 may include any number of circuits for completing the functions described herein. For example, the activities and functionalities of the priority circuit 220, the schedule circuit 222, and the shift circuit 224 may be combined in multiple circuits or as a single circuit. Additional circuits with additional functionality may also be included. Further, the controller 140 may further control other activity beyond the scope of the present disclosure.

As mentioned above and in one configuration, the "circuits" may be implemented in machine-readable medium for execution by various types of processors, such as the processor 204 of FIG. 2. Executable code may, for instance, comprise one or more physical or logical blocks of computer instructions, which may, for instance, be organized as an object, procedure, or function. Nevertheless, the executables need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising computer or machine-readable media for carrying or having computer or machine-executable instructions or data structures stored thereon. Such machine-readable media can be any available media that can be accessed by a computer. The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device. Machine-executable instructions include, for example, instructions and data which cause a computer or processing machine to perform a certain function or group of functions.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more other programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the apparatus and system as shown in the various exemplary embodiments is illustrative only. Additionally, any element disclosed in one embodiment may be incorporated or utilized with any other embodiment disclosed herein.

What is claimed is:

1. A method comprising:
   determining, by a controller, a first or a second priority for a transmission shift point for a system from a plurality of priorities based on data indicative of operation of the system, the data comprising at least one of an operation mode of an engine of the system or a temperature of a component of an aftertreatment system of the system, wherein the first priority is determined based on at least one of the operation mode being in a first mode or the temperature of the component being above a first temperature threshold, and wherein the second priority is determined based on at least one of the operation mode being in a second mode or the temperature being below a second temperature threshold;
   determining, by the controller, the transmission shift point for the system based on the determined first or second priority and at least one of a current gear, a current accelerator pedal position (APP), an acceleration vector, or a target gear, wherein the transmission shift point for the first priority is different from the transmission shift point for the second priority; and taking, by the controller, an action based on the determined transmission shift point.

2. The method of claim 1, wherein the transmission shift point is determined based on a shift schedule, wherein the shift schedule is selected based on the determined first or second priority.

3. The method of claim 2, further comprising:
determining, by the controller, the shift schedule based on one or more maps comprising data indicative of at least one of a brake thermal efficiency (BTE) or a turbine-out temperature (TOT) associated with a performance of an engine of the system.

4. The method of claim 1, wherein the transmission shift point is determined based on a dynamic physics-based model.

5. The method of claim 1, wherein the data indicative of operation of the system further includes at least one of an engine intake manifold temperature, a charge flow rate, an exhaust flow rate, a brake-specific NOx, or look-ahead road grade data.

6. The method of claim 1, wherein taking the action comprises notifying a user of a value of the determined transmission shift point.

7. The method of claim 1, wherein taking the action comprises notifying a user that a current output shaft speed of a transmission is substantially equal to the determined transmission shift point.

8. The method of claim 1, wherein taking the action comprises:
determining, by the controller, that a current output shaft speed of a transmission is substantially equal to the determined transmission shift point; and
responsive to the determination that the current output shaft speed of the transmission is substantially equal to the determined transmission shift point, commanding, by the controller, the transmission to shift from the current gear to the target gear.

9. The method of claim 1, further comprising:
determining, by the controller and subsequent to taking the action, that the first priority is satisfied; and
determining, by the controller, the second priority for the system based on the data indicative of operation of the system.

10. A system, comprising:
a controller comprising a processing circuit including at least one processor coupled to at least one memory storing instructions that, when executed by the at least one processor, cause the controller to:
determine a first or a second priority for a transmission shift point for a system from a plurality of priorities based on data indicative of operation of the system, the data comprising at least one of an operation mode of an engine of the system or a temperature of a component of an aftertreatment system of the system, wherein the first priority is determined based on at least one of the operation mode being in a first mode or the temperature of the component being above a first temperature threshold, and wherein the second priority is determined based on at least one of the operation mode being in a second mode or the temperature being below a second temperature threshold;
determine the transmission shift point for the system based on the determined first or second priority and at least one of a current gear, a current accelerator pedal position (APP), an acceleration vector, or a target gear, wherein the transmission shift point for the first priority is different from the transmission shift point for the second priority; and
take an action based on the determined transmission shift point.

11. The system of claim 10, wherein the transmission shift point is determined based on a shift schedule, wherein the shift schedule is selected based on the determined priority.

12. The system of claim 10, wherein the transmission shift point is determined based on a dynamic physics-based model.

13. The system of claim 10, wherein the data indicative of operation of the system further includes at least one of an engine intake manifold temperature, a charge flow rate, an exhaust flow rate, a brake-specific NOx, or look-ahead road grade data.

14. The system of claim 10, wherein to take the action, the instructions, when executed by the at least one processor, further cause the controller to notify a user of a value of the determined transmission shift point.

15. The system of claim 10, wherein to take the action, the instructions, when executed by the at least one processor, further cause the controller to notify a user that a current output shaft speed of a transmission is substantially equal to the determined transmission shift point.

16. The system of claim 10, wherein to take the action, the instructions, when executed by the at least one processor, further cause the controller to:
determine that a current output shaft speed of a transmission is substantially equal to the determined transmission shift point; and
responsive to the determination that the current output shaft speed of the transmission is substantially equal to the determined transmission shift point, command the transmission to shift from the current gear to the target gear.

17. The system of claim 10, wherein the instructions, when executed by the at least one processor, further cause the controller to:
determine, subsequent to taking the action, that the first priority is satisfied; and
determine the second priority for the system based on the data indicative of operation of the system.

18. A non-transitory computer-readable medium storing instructions that, when executed by at least one processor, cause the at least one processor to perform operations comprising:
determining a first or a second priority for a transmission shift point for a system from a plurality of priorities based on data indicative of operation of the system, the data comprising at least one of an operation mode of an engine of the system or a temperature of a component of an aftertreatment system of the system, wherein the first priority is determined based on at least one of the operation mode being in a first mode or the temperature of the component being above a first temperature threshold, and wherein the second priority is determined based on at least one of the operation mode being in a second mode or the temperature being below a second temperature threshold;
determining the transmission shift point for the system based on the determined first or second priority and at least one of a current gear, a current accelerator pedal position (APP), an acceleration vector, or a target gear, wherein the transmission shift point for the first priority is different from the transmission shift point for the second priority; and taking an action based on the determined transmission shift point.

19. The non-transitory computer-readable medium of claim 18, wherein the transmission shift point is determined based on a shift schedule, wherein the shift schedule is selected based on the determined priority.

20. The non-transitory computer-readable medium of claim 18, wherein the transmission shift point is determined based on a dynamic physics-based model.

* * * * *